United States Patent [19]
Cheong et al.

[11] Patent Number: 5,533,189
[45] Date of Patent: Jul. 2, 1996

[54] SYSTEM AND METHOD FOR ERROR CORRECTION CODE GENERATION

[75] Inventors: Hoichi Cheong; Kimming So, both of Austin, Tex.

[73] Assignee: International Business Machines Corporation, Armonk, N.Y.

[21] Appl. No.: 345,969

[22] Filed: Nov. 28, 1994

[51] Int. Cl.$^6$ .......................... G01R 31/28; G06F 11/00
[52] U.S. Cl. .................. 395/182.04; 395/185.05
[58] Field of Search ............................ 395/575, 182.04, 395/185.01, 185.02, 185.05, 185.06, 185.07; 371/40.1

[56] References Cited

U.S. PATENT DOCUMENTS

| | | | |
|---|---|---|---|
| 4,167,727 | 9/1979 | Anderson | 340/146.1 AG |
| 4,168,486 | 9/1979 | Legory | 340/146.1 AL |
| 4,942,578 | 7/1990 | Nakamura | 371/36 |
| 5,146,461 | 9/1992 | Duschatko et al. | 371/40.1 |
| 5,146,588 | 9/1992 | Crater et al. | 395/575 |
| 5,164,944 | 11/1992 | Benton | 371/40.1 |
| 5,325,508 | 6/1994 | Parks et al. | 395/425 |
| 5,361,267 | 11/1994 | Godiwala | 371/40.1 |

OTHER PUBLICATIONS

Ooi et al., Fault Tolerant Architecture in a Cache Memory Control LSI, IEEE Journal of Solid–State Circuits, vol. 27 No. 4 Apr. 1992, pp. 507–514.

*Primary Examiner*—Robert W. Beausoliel, Jr.
*Assistant Examiner*—Glenn Snyder
*Attorney, Agent, or Firm*—Kelly K. Kordzik; Winstead Sechrest & Minick; Mark E. McBurney

[57] ABSTRACT

Error correction code ("CECC") generation within a directory or memory controller is distributed between generation of an ECC for the tag and status portions of a directory entry and then summed to produce the ECC bits for the directory entry. The ECC generation may be performed for entries with respect to a cache for a uniprocessor or multiprocessor system or for system memory within such a data processing system. The ECC generation of the present invention reduces by one or more cycles the required time utilized for updating a directory entry.

7 Claims, 5 Drawing Sheets

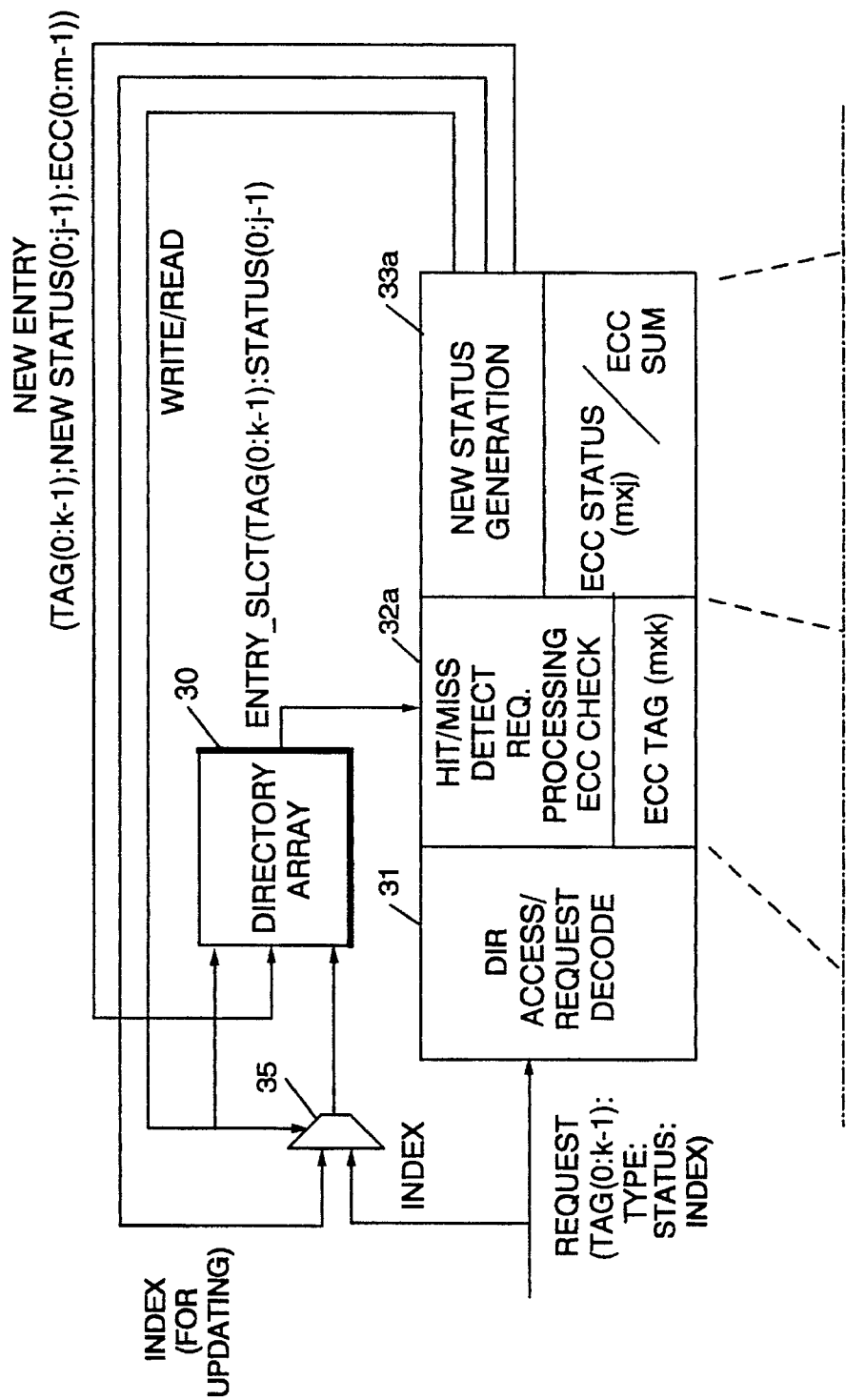

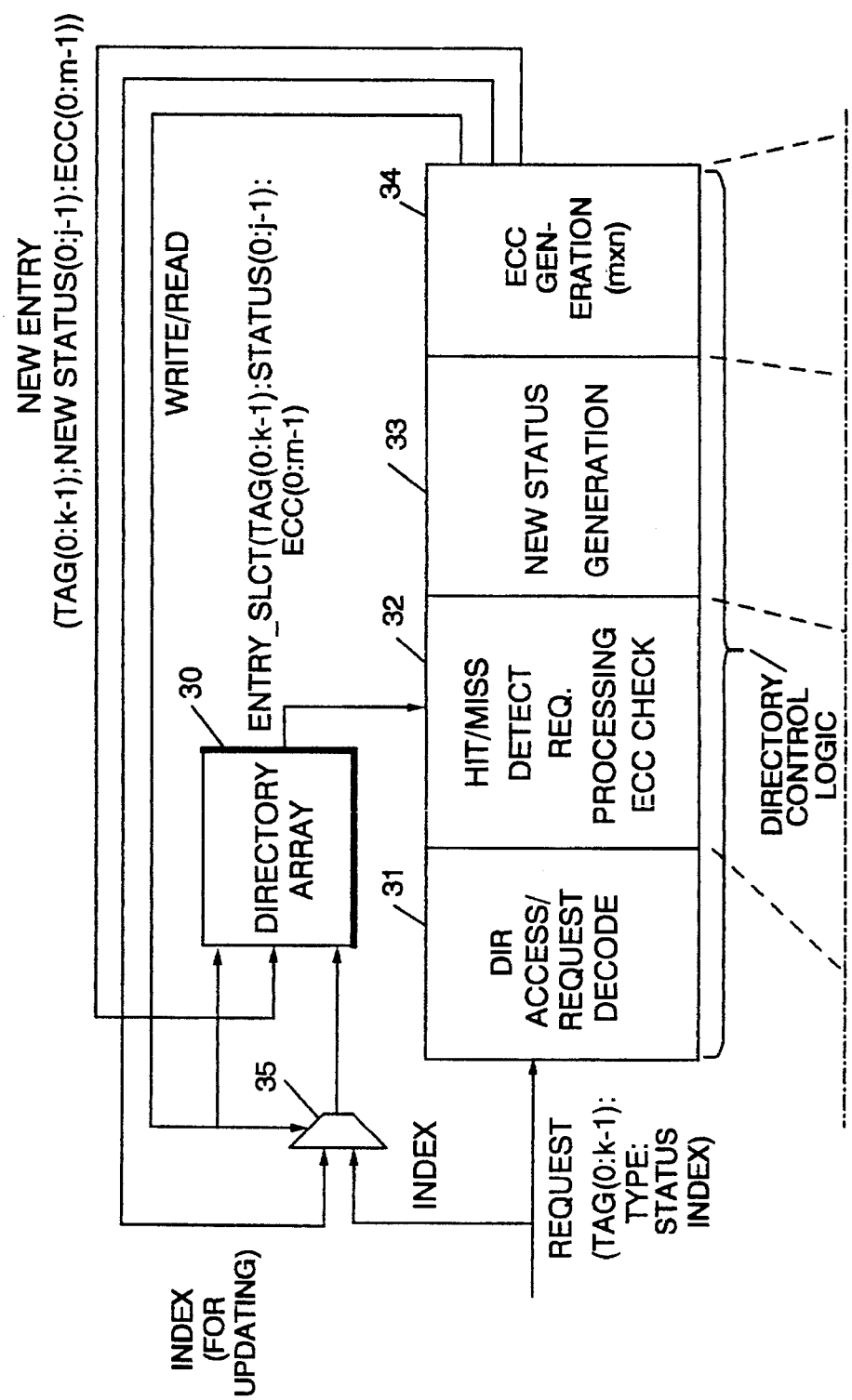

SYSTEM AND METHOD FOR ERROR CORRECTION CODE GENERATION

TECHNICAL FIELD OF THE INVENTION

The present invention relates in general to data processing systems, and in particular, to the generation of error correction code for entries in a directory associated with a memory array.

BACKGROUND OF THE INVENTION

In certain data processing systems, a directory of cache or memory (a memory directory is used in the shared global memory in multiprocessor systems) contains an array of entries that correspond one-to-one to data entries in the cache or the memory data array. Each directory entry contains an address tag and status bits. The address tag of the directory entry is the tag portion of the address of the data entry in the lowest level of the memory hierarchy. The data entry and the directory entry are retrieved by using the index portion of the request address to index into the directory array and the data array. The address tag of the retrieved directory entry is used to match the tag portion of the request. If matched, the valid entry in the data array is the addressed data. The status bits include a valid bit, value 1 of which indicates that the data entry is a valid one and value 0 otherwise. The status bits also may include a modified (dirty) bit which indicates whether the valid data entry contains a new value. When the bit has value 1, the entry has a new value which will be written back to the next lower level of memory hierarchy when the data entry is evicted to make room for a data entry of a new address. Status bits also may, depending on machine organization, include other bits such as "exclusive bit" or "inclusion bits" which are primarily used in multiple processor systems.

When a request is received by the cache or memory, the index of the request is used to read the directory. Then, upon determining that the retrieved entry is the addressed entry by matching the address tags, the request is processed. Depending on the request type (by the decode operation), new status bit values or new address tag bits need to be written back into the directory entry. For example, if the request is a castout or a write from the next higher level of memory hierarchy, the modified bit needs to be changed to one. Or, if the request is a castout from the current cache, the valid bit needs to be set to zero. Another example is when the request is for loading a new data entry from the lower level of memory hierarchy. In this case, a new address tag needs to be written into the directory entry and the modified bit needs to be reset to zero. Also, in a multiprocessor system, when more than one next higher level cache is connected to the current level caches, requests from the next higher level caches will result in "exclusive bit" or "inclusion bit" changes. The index portion of the request address will be used to locate the directory entry to which the write will be performed.

New status bits values result in new ECC (error correction code) bit values, and as a result new ECC bit values need to be generated.

Error correction coding is a method of encoding information so that errors that occur during transmission or storage of data can be detected and also corrected. With respect to entries in memory devices, it is imperative that both the addresses for finding such entries and the status information for indicating such things as whether or not the associated memory entry is the latest version of that data must be exactly maintained so that there is not a loss of data stored in memory or there is not a use of invalid data by one of the devices within a data processing system. A mere error in one bit within an address may result in a loss of the associated data. Error correction coding is a method employed to detect such errors and correct them.

A problem with the generation of error correction code ("ECC") is that it often requires an extra step during a read or write operation. This extra step often involves the requirement or one or more additional clock cycles to perform the ECC generation, which is a concern in today's high frequency designs of data processing systems where the reduction of processing cycles is an ongoing endeavor.

This may be especially noted within the design of cache-related circuitry associated with processor(s) in a data processing system. If each read or write operation requires an additional processor cycle, it can be readily appreciated how the reduction in one processor cycle can result in a much faster design.

Thus, minimizing ECC circuitry is very important in high frequency cache designs, because the ECC logic is often located on a critical path during the performance of read/write operations. Therefore, while ECC has become a must in high-reliability systems, to accommodate ECC without sacrifice and performance is a critical issue.

The discussion herein focuses on pipelined directory controllers. Pipelined controllers are needed because all the operations involved in processing a request to the cache or memory take too long to complete. By using a pipelined controller, more requests can be processed in a fixed duration of time. The operations of each request are divided into small partitions each processed by a different pipeline stage, which takes a smaller amount of time, a pipeline cycle, to finish. The pipeline can start processing a new request every pipeline cycle. A pipelined controller is very useful in providing high bandwidth to requests.

The conventional approach of a pipelined directory controller is depicted in FIG. 3. A request is first decoded in the first stage while the directory is looked up by the index portion of the address. This is the directory access/request decode stage 31. A request is decoded into types which will give different responses to the requester, or perform different modifications on the directory entry. When the directory entry is read out (several entries may be read out simultaneously in a set associative cache), its address tag is compared to the address tag of the request, and the valid bit from the directory entry is checked. If the checking verifies the valid entry and the tags match, a hit signal is sent back to the requester with the data entry read out from the data array; otherwise a miss signal will be sent to the requester. In the meantime, the ECC bits of the directory entry are checked for error. These operations are performed in stage 32 and the new directory entry and the new ECC bits are ready to be written back to the directory. If writing a new entry is necessary, the logic in stage 34 will assert the write/read signal which will cause multiplexer 35 to select, from the address of the request that just finished stage 34, the index for updating the directory. The update occurs in the cycle after stage 34 and is denoted by signals from stage 34 to directory array 30 and multiplexer 35. In the update cycle, a new request coming into the controller needs to be reissued or the controller logic will stall any incoming request for that cycle to let the directory to be written. When a request generates no entry to be written back to the directory, the logic in stage 34 will deassert the write/read signal such that multiplexor 35 will select the next incoming request.

The director entry (Entry_slct) read out from directory array 30 by a request and inputted into stage 32 is illustrated with n (=k +j) bits of information (a k bit tag and a j bit status) and m ECC check bits. One request processing operation determines whether to construct a new entry for directory 30 or to simply modify an existing directory entry. For the former, the tag accompanying the request will be used as the tag for the new directory entry. For the latter, the tag read out and selected (e.g., in the set associative cache) will be used. If a request finds the addressed entry, and the purpose of the request is to access (read or write) the data entry, then the same address tag should remain in the directory entry. In this case, the tag select will enable the tag portion of the entry_slct to pass multiplexer 14. However, if the request does not find the addressed entry and results in replacing the existing data entry from the data entry from the next lower level memory in the hierarchy, the tag from the request will be enabled to pass multiplexer 14.

Thereafter, in stage 33, in accordance with the results of the hit/miss detection and the processing of the request, new status bits are generated (logic 17) for the new entry. In stage 34, an ECC is generated (logic 20) for the entry information selected in stage 33 to update directory array 30. The ECC generation logic 20 operates on the n information bit of the entry to generate a new m-bit ECC. With the short cycle time, the ECC generation often cannot be combined with the logic in the previous stages 31–33 and still meet timing requirements in the conventional approach. In a conventional design, ECC generation will not start until the new directory entry is ready. The last part of the new entry will not be ready until the end of the cycle time in stage 33. The time it takes to generate ECC bits for the entire directory entry takes about a large portion of a cycle. Therefore, if the ECC generation for the entire entry is moved to the previous stage, the time to generate the last part of the new entry plus the time to generate ECC for the entire entry will exceed the cycle time required. Therefore, it cannot be combined with previous stages in a conventional approach. Therefore, the extra pipeline stage 34, and the request processing latency, requires an additional cycle.

Thus, there is a need in the art for an ECC generation technique that does not require an extra cycle to process.

SUMMARY OF THE INVENTION

Thus, it is an objective of the present invention to generate an ECC for each request received within a memory device controller in a manner that does not require an extra cycle in order to generate the ECC.

In an attainment of the above objective, the present invention makes use of the linearity property of ECC code generation and the pipeline nature of directory control logic design and the localized change of a directory entry in order to minimize the ECC generation circuitry.

Because of the linear property of ECC generation, ECC generation pertaining to the tag and status bits can be separated and then the resulting ECC generated for each can then be summed to produce the resultant ECC for the directory entry. As a result, ECC generation with respect to the tag bits can be performed immediately upon selection of the tag, while ECC generation with respect to the status bits can be performed immediately upon generation of the status information. These two ECC codes can then be summed without the requirement of an additional step within the directory control logic.

The present invention may be implemented within a cache directory control logic or system memory control logic in a data processing system, such as a multiprocessor system, including one or more processors coupled by a system bus to a system memory and various input/output devices.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings in which.

DETAILED DESCRIPTION OF A PREFERRED EMBODIMENT OF THE INVENTION

Figure 1B:
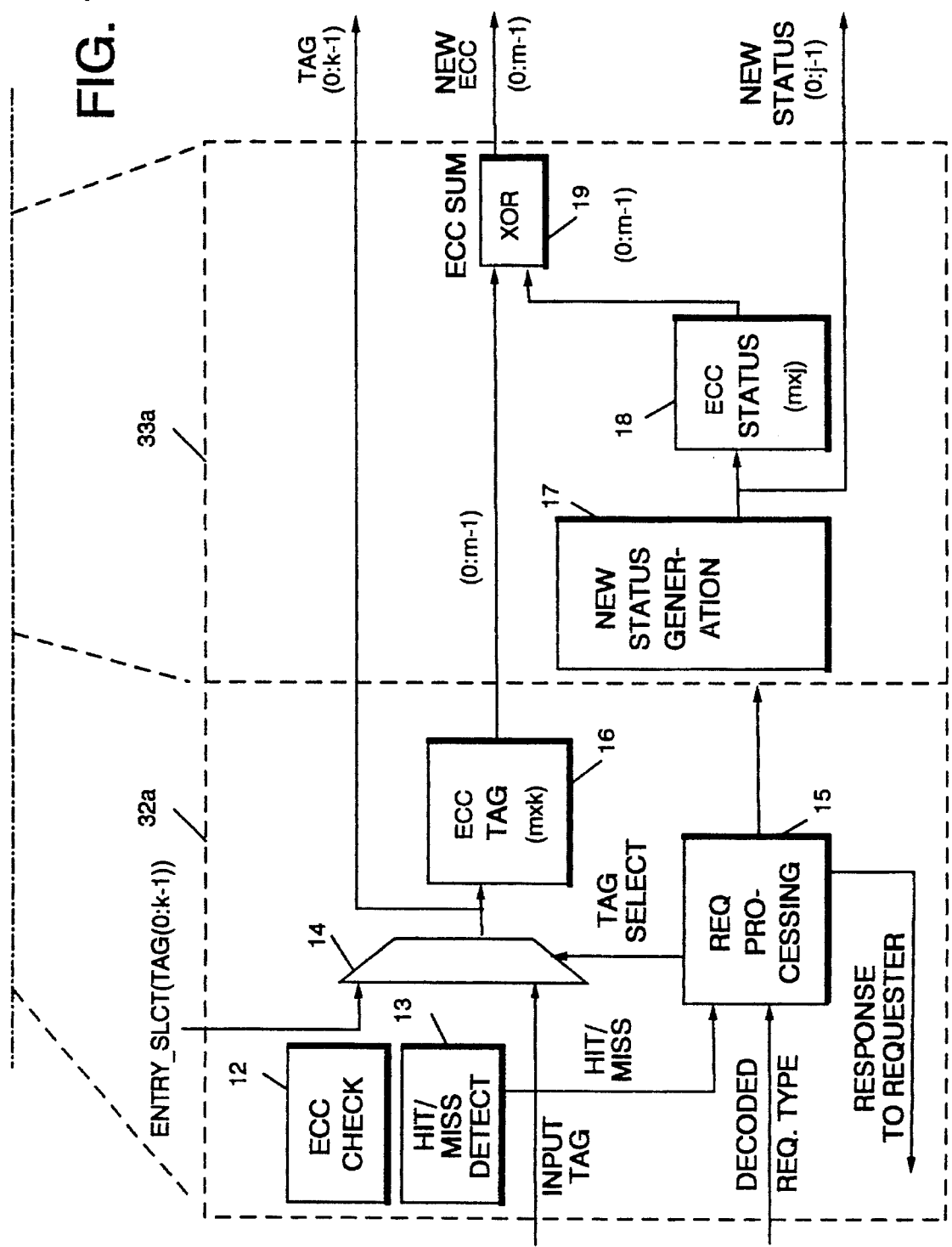
FIG. 1 consisting of FIGS. 1A and 1B illustrates a preferred embodiment of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

In the following discussion, a single-port directory is assumed in which only a read, or a write can be performed to the directory at any instant. However, this invention can be applied to a multiported directory to which combinations of read and write operations can be performed at any instant.

Refer now to the drawings wherein depicted elements are not necessarily shown to scale and wherein like or similar elements are designated by the same reference numeral through the several views.

Figure 2:
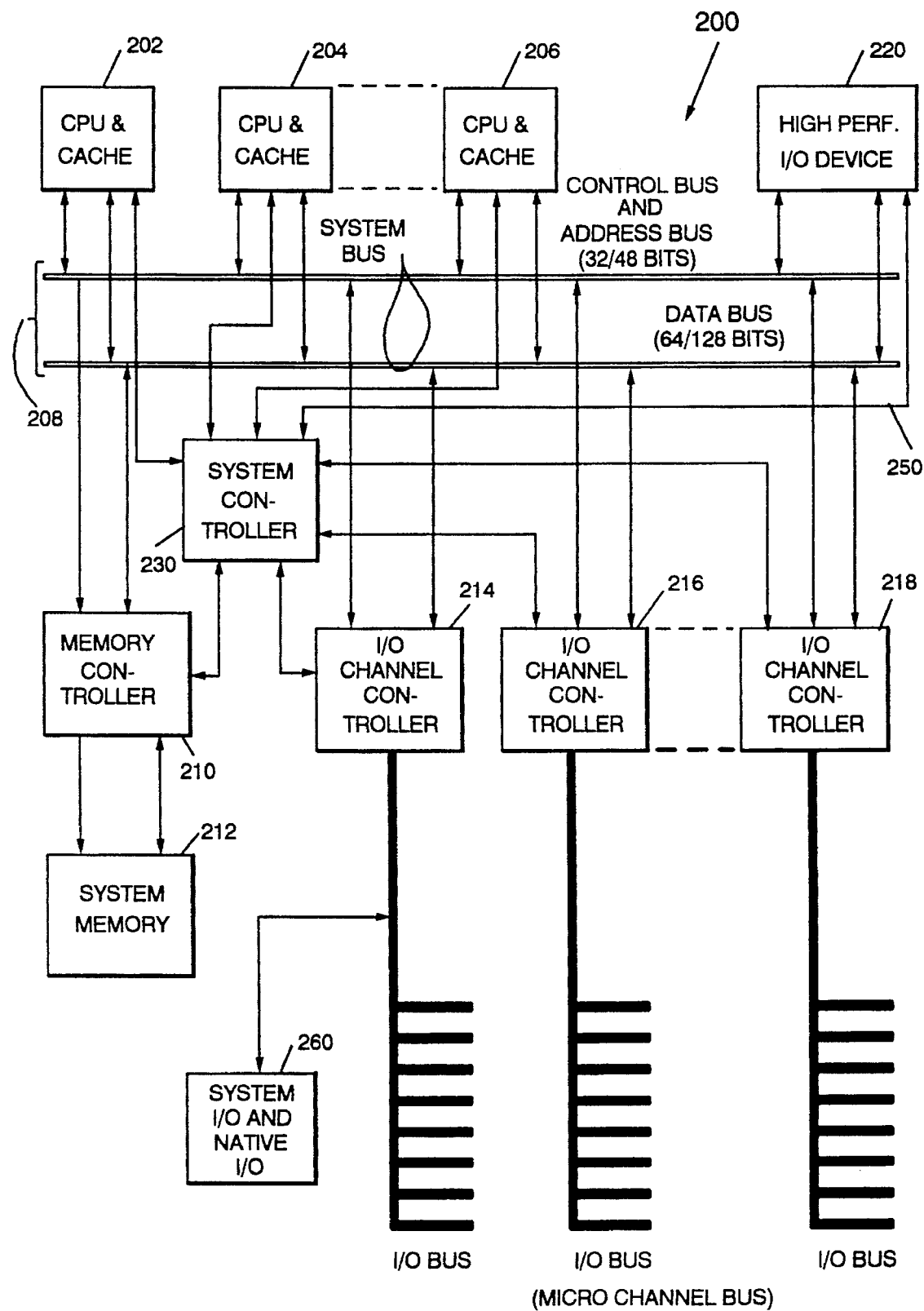
FIG. 2 illustrates a data processing system for implementing the present invention.
Figure 3B:
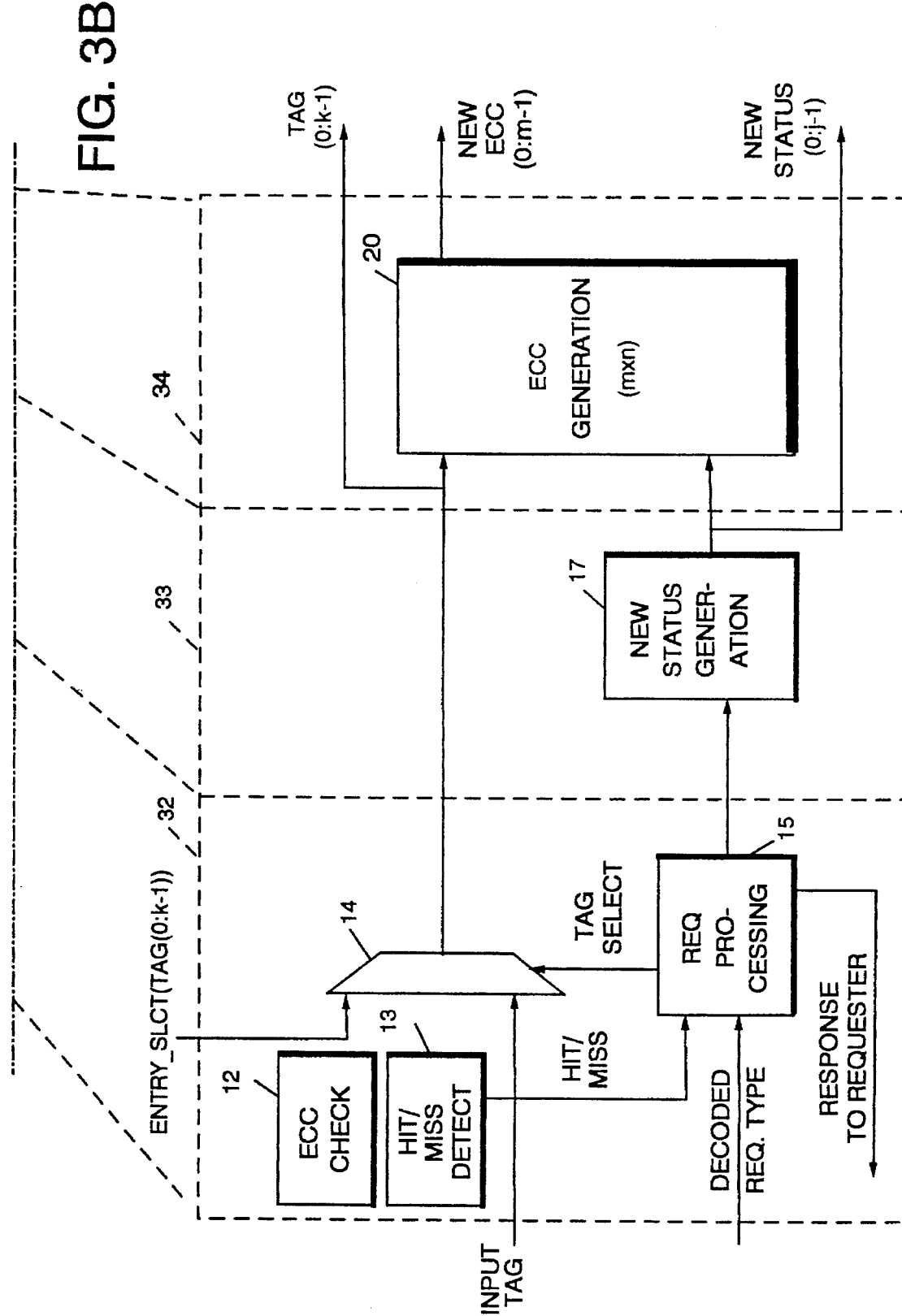
FIG. 3 consisting of FIGS. 3A and 3B illustrates a prior art ECC generation scheme.

Referring to FIG. 2, there is illustrated a multiprocessor system for embodying the present invention. Note that the present invention may also be implemented within a uniprocessor system. Processors 202, 204 and 206 include caches and are coupled via control, address and data bus 208 to memory controller 210, which is coupled to system memory 212, high performance input/output ("I/O") device 220, and I/O channel controllers 214, 216 and 218. I/O channel controller 214 is coupled to system I/O and native I/O 260. I/O channel controllers 214, 216 and 218 are also coupled to I/O busses within a microchannel bus. Note, the aforementioned devices are also coupled to system controller 230.

The directory control logic of the present invention may be implemented along with any one of the caches within processors 202, 204 and 206 or within memory controller 210.

Referring next to FIG. 1, there is illustrated a preferred embodiment of the present invention with respect to control logic associated with a memory controller for a cache or system memory 212. The ECC generation within the present invention results from an n-bit data entry x, which is equivalent to multiplying x by a binary matrix A, Ax=E, where A=[$A_0, \ldots, A_{n-1}$], $A_i$'s are column vectors of m bits, x is a binary vector of n bits [$x_0, x_1, \ldots, x_{k-1}, x_k, \ldots, x_{k+j-1}$]$^T$ (the superscript represents the transport of the vector). E, the m-bit vector as the result of the matrix multiplication, is the ECC code.

Because it is a matrix multiplication of binary numbers, linearity properties of matrix multiplication apply, and the ECC generation can be decomposed. If x=y+z, y=[$x_0, x_1, \ldots, x_{k-1}, 0, \ldots, 0$]$^T$ and z=[$0, \ldots, 0, x_k, \ldots, x_{k+j-1}$]$^T$, Ax=A(y XOR z)=By XOR Cz, where B=[$A_0, \ldots, A_{k-1}, 0_0, \ldots, 0_{j-1}$], C=[$0_0, \ldots, 0_{k-1}, A_k, \ldots, A_{k+j-1}$] and $0_i$ are m-bit column vectors of zeros. Let B'=[$\ldots, A_{k-1}$], C'=[$x_k, \ldots, x_{k+j-1}$], y'=[$x_0, x_1, \ldots, x_{k-1}$]$^T$, and z'=[$x_k, \ldots, x_{k+j-1}$]$^T$. Then, By=B'y' and Cz=C'z'. With this reduction, the original mxn ECC generation circuit for Ax=E can be decomposed. The implementation effectively becomes the sum (XOR) of two smaller ECC generation circuits: mxk and mxj ECC generation circuits.

An updated directory entry requiring a new ECC most often only requires a portion of the entry updated. When an existing directory entry is modified, only the status bits are changed and the address tag read from directory 30 stay unchanged. In this case, the address tag is available at stage 32 and can be extracted from either the entry_slct or obtained from the input tag. The only time when the directory update entry need a new address tag occurs when the request cannot find the entry and causes a new data entry to be loaded from the next lower level memory. In this case, the address tag is in the input tag, and is available in stage 31.

With every increasing address range, the tag portion entry is generally much larger than the status information. Newer computers can address wider ranges of memory; therefore the number of bits in the address is getting larger. The address for the power PC can currently go up to 54 bits. In a typical cache of 128K byte, 6 bits are used for the line size and 11 bits are used to index the cache. The tag will be 37 bits. Compared to normally 5 status bits (1 valid, 4 MESI bits used in a typical multiprocessor coherence protocol), the number of address tag bits is much larger than the number of status bits. Thus, ECC code generation can be distributed among the tag portion and the status portion of the directory entry.

A request is received by stage 31, decoded and passed to stage 32a, which performs a checking of the ECC within ECC check logic 12 and a determination if there is a hit or a miss within hit/miss detect logic 13, which are both well-known circuits in the art. It is not shown that block 12 (ECC check) takes an input from entry_slct and so does block 13 (Hit/Miss Detect). Because they are not directly related to the invention, these inputs are omitted. The decoded request type is received by logic circuitry within block 15, which is utilized to select within multiplexor 14 between the tag inputted with the request and the tag received from directory array 30. The selected tag is then passed on and inserted into block 16 in order to generate the tag portion of the ECC with mxk ECC logic circuitry 16, which is well-known in the art. The functions in block 15 and block 17 are implementation specific. In general, the decoded request type from the decode operation in stage 31 is acted on by block 15. It responds to the requester according to the result of the Hit/Miss logic and the request type. Also, it passes the decoded request type and its response (to the requester) to the status bit generation logic in the next stage. From the response type from block 15 and the decode request types, block 17 decides which status bits need to be updated. For example, a request that triggers a load of a new data entry from the next lower level of memory will need to set the valid bit. Also, a castout request from the current level of memory will need to clear the valid bit; or, a write from the next higher level cache will set the modify bit. Depending on the complexity of the control logic, in a complex design block 17 may also take the status bits from the entry_slct as input in order to generate new values of the status bits.

From block 17, the new status bits are inputted into block 18 so that an ECC is generated for the status portion with mxj ECC generation logic circuitry 18. Block 19, which performs an XOR, or sum operation, sums the ECC received from block 16 and the ECC received from block 18 to therefore output the new ECC for the directory entry.

Because the tag in the update entry has many more bits than the status bit portion (37 bits versus 5 bits in the above description), the ECC generation for the status portion (block 18) takes a very small portion of the cycle time to complete. Therefore, block 18 can be moved into stage 33. The key is that the time to finish status bit generation (block 17), plus the time to finish ECC generation for the status bits (block 18), plus the time of ECC sum (block 19) do not exceed the cycle time, and that they can fit in one stage of the pipeline.

With the foregoing hardware in mind, it is possible to explain the process-related features of the present invention. To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Although the present invention and its advantages have been described in detail, it should be understood that various changes, substitutions and alterations can be made herein without departing from the spirit and scope of the invention as defined by the appended claims.

What is claimed is:

1. A data processing system comprising:

a processor;

a system memory;

a bus coupling said processor and said system memory;

a cache coupled to said processor;

a directory array coupled to said cache;

means for receiving a write or read request associated with an entry in said cache;

means for receiving tag bits associated with said received write or read request associated with said entry in said cache;

means, coupled to said means for receiving tag bits associated with said received write or read request associated with said entry in said cache, for generating an ECC associated with said received tag bits;

means for updating status bits associated with said received write or read request associated with said entry in said cache;

means, coupled to said means for updating status bits associated with said received write or read request associated with said entry in said cache, for generating an ECC associated with said updated status bits;

means, coupled to said means for generating an ECC associated with said received tag bits and said means for generating an ECC associated with said updated status bits, for summing said ECC associated with said received tag bits with said ECC associated with said updated status bits; and means for storing said summed ECC, said updated status bits, and said tag bits in said directory array coupled to said cache.

2. The data processing system as recited in claim 1, wherein said summing means further includes an XOR logic circuit for performing an XOR operation between said ECC associated with said received tag bits and said ECC associated with said updated status bits.

3. The data processing system as recited in claim 1, wherein said received tag bits associated with said received write or read request associated with said entry in said cache originated in said directory array.

4. The data processing system as recited in claim 1, wherein said status bits include a valid bit or a modified bit.

5. A data processing system comprising:

a processor;

a system memory;

a bus coupling said processor and said system memory;

a memory array coupled to said processor;

a directory array coupled to said memory array;

means for receiving a write or read request associated with an entry in said memory array;

means for receiving tag bits associated with said received write or read request associated with said entry in said memory array;

means, coupled to said means for receiving tag bits associated with said received write or read request associated with said entry in said memory array, for generating an ECC associated with said received tag bits;

means for updating status bits associated with said received write or read request associated with said entry in said memory array;

means, coupled to said means for updating status bits associated with said received write or read request associated with said entry in said memory array, for generating an ECC associated with said updated status bits;

means, coupled to said means for generating an ECC associated with said received tag bits and said means for generating an ECC associated with said updated status bits, for summing said ECC associated with said received tag bits with said ECC associated with said updated status bits; and means for storing said summed ECC, said updated status bits, and said tag bits in said directory array coupled to said memory array.

6. A data processing system comprising:

a processor;

a system memory;

a bus coupling said processor and said system memory;

a memory array coupled to said processor;

a directory array coupled to said memory array;

means for receiving a write or read request associated with an entry in said memory array;

means for receiving tag bits associated with said received write or read request associated with said entry in said memory array;

means, coupled to said means for receiving tag bits associated with said received write or read request associated with said entry in said memory array, for generating an ECC associated with said received tag bits;

means for updating status bits associated with said received write or read request associated with said entry in said memory array;

means, coupled to said means for updating status bits associated with said received write or read request associated with said entry in said memory array, for generating an ECC associated with said updated status bits; and means, coupled to said means for generating an ECC associated with said received tag bits and said means for generating an ECC associated with said updated status bits, for summing said ECC associated with said received tag bits with said ECC associated with said updated status bits.

7. The data processing system as recited in claim 6, wherein said memory array is a cache.

* * * * *

UNITED STATES PATENT AND TRADEMARK OFFICE
CERTIFICATE OF CORRECTION

PATENT NO. : 5,533,189
DATED : July 2, 1996
INVENTOR(S) : Cheong et al.

It is certified that error appears in the above-indentified patent and that said Letters Patent is hereby corrected as shown below:

<u>Column 5, line 8</u>: Replace "$[X_0, X_1, \ldots, X_{k-l}, x_k, \ldots, X_{k+j-1}]^T$" with
--$[X_0, X_1, \ldots, X_{k-1}, X_k, \ldots, X_{k+j-1}]^T$--.

<u>Column 5, lines 14-15</u>: Replace "$y = [X_0, X_1, \ldots, X_{k-1}, 0, \ldots, 0]^T$" with
--$y = [X_0, X_1, \ldots, X_{k-1}, 0, \ldots, 0]^T$--.

<u>Column 5, line 18</u>: Replace "Let B∝ . . . , $A_{k-1}$]" with
--Let B' = [$A_0, \ldots, A_{k-1}$]--.

<u>Abstract, line 7</u>: Replace "Error correction code ("CECC")" with
--Error correction code ("ECC")--.

Signed and Sealed this

Fifteenth Day of July, 1997

*Attest:*

BRUCE LEHMAN

*Attesting Officer*     Commissioner of Patents and Trademarks